US010225283B2

(12) United States Patent
Mathew et al.

(10) Patent No.: US 10,225,283 B2
(45) Date of Patent: Mar. 5, 2019

(54) PROTECTION AGAINST END USER ACCOUNT LOCKING DENIAL OF SERVICE (DOS)

(71) Applicant: Oracle International Corporation, Redwood Shores, CA (US)

(72) Inventors: Stephen Mathew, Bangalore (IN); Ramya Subramanya, Bangalore (IN); Vipin Anaparakkal Koottayi, Trikarpur (IN)

(73) Assignee: Oracle International Corporation, Redwood Shores, CA (US)

( * ) Notice: Subject to any disclaimer, the term of this patent is extended or adjusted under 35 U.S.C. 154(b) by 143 days.

(21) Appl. No.: 15/298,624

(22) Filed: Oct. 20, 2016

(65) Prior Publication Data

US 2017/0126733 A1    May 4, 2017

Related U.S. Application Data

(60) Provisional application No. 62/245,204, filed on Oct. 22, 2015.

(51) Int. Cl.
*G06F 21/00* (2013.01)
*H04L 29/06* (2006.01)

(52) U.S. Cl.
CPC ........ *H04L 63/1458* (2013.01); *H04L 63/083* (2013.01); *H04L 63/0861* (2013.01)

(58) Field of Classification Search
CPC ........... G09G 3/3677; G09G 2330/021; G09G 2310/08; G09G 2310/0213
See application file for complete search history.

(56) References Cited

U.S. PATENT DOCUMENTS 6,246,769 B1    6/2001  Kohut
6,412,077 B1    6/2002  Roden et al.
(Continued)

FOREIGN PATENT DOCUMENTS

CN      104660412 A     5/2015
EP         2743857        6/2014
(Continued)

OTHER PUBLICATIONS

International Application No. PCT/US2016/058016, International Search Report and Written Opinion dated Dec. 7, 2016, 13 pages.
(Continued)

*Primary Examiner* — Mahfuzur Rahman
(74) *Attorney, Agent, or Firm* — Kilpatrick Townsend & Stockton LLP

(57) ABSTRACT

Techniques are disclosed for protecting a user from denial of service (DOS) to access his/her a user account that has been locked. An access management system can provide features that enable an owner of an account to prevent the account from becoming locked. Specifically, the techniques disclosed herein enable an account holder to circumvent procedures of the access management system that lock an account after several unsuccessful attempts to access the account. The access management system may operate according to a configuration for managing access to account. The access management system can manage access to an account by presenting a user with an interface to received access information (e.g., account information and credential information) for the account to determine whether to unlock the account. The access management system can deny access to an account upon determining that the credential information is not correct for the account.

18 Claims, 9 Drawing Sheets

(56) References Cited

U.S. PATENT DOCUMENTS

| | | |
|---|---|---|
| 6,892,307 B1 | 5/2005 | Wood et al. |
| 6,950,949 B1 | 9/2005 | Gilchrist |
| 7,086,085 B1 | 8/2006 | Brown et al. |
| 7,523,309 B1 | 4/2009 | Talbot et al. |
| 7,562,222 B2 | 7/2009 | Gasparini et al. |
| 7,904,946 B1 | 3/2011 | Chu et al. |
| 8,010,996 B2 | 8/2011 | Cline et al. |
| 8,122,251 B2 | 2/2012 | Santos et al. |
| 8,141,140 B2 | 3/2012 | Wenzel et al. |
| 8,281,379 B2 | 10/2012 | Noe |
| 8,302,167 B2 | 10/2012 | Mennes et al. |
| 8,312,519 B1 | 11/2012 | Bailey et al. |
| 8,327,422 B1 | 12/2012 | Friedman et al. |
| 8,453,224 B2 | 5/2013 | Mutt |
| 8,555,355 B2 | 10/2013 | Rathbun |
| 8,578,476 B2 | 11/2013 | Sama |
| 8,625,796 B1 | 1/2014 | Ayed |
| 8,627,438 B1 | 1/2014 | Bhimanaik |
| 8,763,097 B2 | 6/2014 | Bhatnagar et al. |
| 8,843,997 B1 | 9/2014 | Hare |
| 8,856,892 B2 | 10/2014 | Faludi |
| 8,898,765 B2 | 11/2014 | Goyal et al. |
| 9,864,944 B2 | 1/2018 | Radu et al. |
| 2003/0070091 A1 | 4/2003 | Loveland |
| 2004/0128561 A1 | 7/2004 | Bouchat et al. |
| 2004/0167984 A1 | 8/2004 | Herrmann |
| 2004/0215750 A1 | 10/2004 | Stilp |
| 2005/0015594 A1 | 1/2005 | Ashley et al. |
| 2005/0156947 A1 | 7/2005 | Sakai et al. |
| 2006/0056415 A1 | 3/2006 | Lee et al. |
| 2006/0145842 A1 | 7/2006 | Stilp |
| 2006/0274920 A1* | 12/2006 | Tochikubo .............. G06F 21/32 382/124 |
| 2007/0136573 A1 | 6/2007 | Steinberg et al. |
| 2007/0199053 A1 | 8/2007 | Sandhu et al. |
| 2007/0200597 A1 | 8/2007 | Oakland |
| 2008/0148351 A1 | 6/2008 | Bhatia et al. |
| 2009/0037763 A1 | 2/2009 | Adhya et al. |
| 2009/0288148 A1 | 11/2009 | Headley et al. |
| 2009/0292927 A1 | 11/2009 | Wenzel et al. |
| 2010/0146263 A1 | 6/2010 | Das et al. |
| 2011/0320616 A1 | 12/2011 | Wray |
| 2011/0320820 A1 | 12/2011 | Wray |
| 2012/0066749 A1 | 3/2012 | Taugbol et al. |
| 2012/0203906 A1 | 8/2012 | Jaudon et al. |
| 2012/0314862 A1* | 12/2012 | Min ...................... H04L 9/3215 380/255 |
| 2013/0159732 A1 | 6/2013 | Leoutsarakos et al. |
| 2013/0185209 A1 | 7/2013 | Ahn |
| 2013/0198613 A1 | 8/2013 | Scoda |
| 2013/0205373 A1 | 8/2013 | Jaudon et al. |
| 2013/0219479 A1 | 8/2013 | DeSoto et al. |
| 2013/0290719 A1 | 10/2013 | Kaler et al. |
| 2014/0082706 A1 | 3/2014 | Banford |
| 2014/0096190 A1 | 4/2014 | Subramanya et al. |
| 2014/0208386 A1* | 7/2014 | Sama ...................... H04L 63/14 726/4 |
| 2014/0214688 A1 | 7/2014 | Weiner et al. |
| 2014/0250490 A1 | 9/2014 | Baca et al. |
| 2014/0279445 A1 | 9/2014 | Jiang et al. |
| 2015/0121503 A1 | 4/2015 | Xiong |
| 2015/0150110 A1* | 5/2015 | Canning ............. H04L 63/0807 726/9 |
| 2015/0222615 A1 | 8/2015 | Allain et al. |
| 2015/0249540 A1 | 9/2015 | Khalil et al. |
| 2015/0304847 A1 | 10/2015 | Gong et al. |
| 2016/0063226 A1 | 3/2016 | Singh et al. |
| 2016/0065554 A1 | 3/2016 | Brown et al. |
| 2016/0285871 A1 | 9/2016 | Chathoth et al. |
| 2016/0379431 A1* | 12/2016 | Borg .................. G07C 9/00706 340/5.28 |
| 2017/0034152 A1 | 2/2017 | Subramanya et al. |
| 2017/0118025 A1 | 4/2017 | Shastri et al. |
| 2017/0118202 A1 | 4/2017 | Mathew et al. |
| 2017/0118223 A1 | 4/2017 | Mathew et al. |

FOREIGN PATENT DOCUMENTS

| | | |
|---|---|---|
| WO | 2012156785 A1 | 11/2012 |
| WO | 2014041336 A1 | 3/2014 |
| WO | 2017070412 | 4/2017 |

OTHER PUBLICATIONS

U.S. Appl. No. 14/671,935, Final Office Action dated Mar. 23, 2017, 24 pages.

U.S. Appl. No. 14/671,935, Non-Final Office Action dated Aug. 28, 2017, 26 pages.

"Designing a good security policy for your websites" http://programmergamer.blogspot.in/2013_04_01_archive.html(Apr. 29, 2013) 4 pages.

"Problems viewing or passing CAPTCHA verification" [site visited Jun. 19, 2015] https://help.yahoo.com/kb/SLN2662.html,1 page.

"One Strong Authentication Solution for Every CA SSO Application" [site visited Jun. 19, 2015] http://www.idfconnect.com/products/sso-mobilekey/,1 page.

"Show PHP Captcha on Failed Login Attempts" phppot.com http://phppot.com/php/show-php-captcha-on-failed-login-attempts/ (copyright 2008-2014), 6 pages.

Sani "Preventing Brute Force Login Attacks to the Citrix NetScaler Gateway/AAA-TM Login Pages" http://blogs.citrix.com/2012/02/01/preventing-brute-force-login-attacks-to-the-citrix-netscaler-access-gateway-or-aaa-for-tm-login-page-%E2%80%93-part-1/ (Feb. 1, 2012), 6 pages.

"How to Configure a Separate Maximum Failure Counter and Threshold for OTP Authentication" [site visited Jun. 18, 2015] https://support.ca.com/cadocs/O/CA%20SiteMinder%2012%2052%20SP1-ENU/Bookshelf Files/HTML/idocs/index.htm?toc.htm?1945685.html?intcmp=searchresultclick&resultnum=1805, 2 pages.

*McAfee One Time Password 3.5 Administration Guide* https://kc.mcafee.com/resources/sites/MCAFEE/content/live/PRODUCT_DOCUMENTATION/24000/PD24538/en_US/OTP_3_5_admin_guide.pdf (Copyright 2013)120 pages.

"Overload Protection" Paessler AG http://kb.paessler.com/en/topic/25523-what-is-overload-protection(Sep. 28, 2011), 9 pages.

Non-Final Office Action for U.S. Appl. No. 14/671,935 dated Sep. 22, 2016, 22 pages.

Dhamija et al., "Phish and HIPs: Human Interactive Proofs to Detect Phishing Attacks", Second International Workshop on Human Interactive Proofs (HIP 2005), pp. 127-141 (May 1, 2005).

DirX Access V8.3 Web Access Management and Identity Federation. Technical Data Sheet [online]. Dec. 2013, Copyright 2013 Atos [retrieved on Sep. 4, 2014]. Retrieved from the Internet: <URL: http://atos.net/content/dam/global/documents/we-do/atos-dirx-access-v83-datasheet.pdf>, 14 pages.

eToken 3500—OTP Banking Token. safenet-inc.com [online]. Copyright 2006-2015 Gemalto NV [site visited Sep. 4, 2014]. Retrieved from the Internet: <URL: http://www.safenet-inc.com/multi-factor-authentication/authenticators/one-time-password-otp/etoken-3500-banking-token/#content-left>, 2 pages.

HSBC Internet Banking Terms and Conditions. hsbc.co.in [online]. Copyright 2015, The Hongkong and Shanghai Banking Corporation Limited, India (HSBC India) [site visited Sep. 4, 2014]. Retrieved from the Internet: <URL: http://www.hsbc.co.in/1/2/ALL_SITE_PAGES/HUB_PIB/PIB_TERMS_AND_CONDITIONS#pib5>, 30 pages.

IBM Worklight application authenticity overview. IBM.com [online]. IBM Corporation [retrieved Feb. 6, 2015]. Retrieved from the Internet: <URL: http://www-01.ibm.com/support/knowledgecenter/SSZH4A_6.1.0/com.ibm.worklight.dev.doc/dev/c_ibm_worklight_app_authentication_overview.html>, 3 pages.

International Search Report and Written Opinion for patent application PCT/US2016/025402 dated Jul. 18, 2016, 14 pages.

(56) References Cited

OTHER PUBLICATIONS

JPMorgan ACCESS℠ Security Features. Datasheet [online]. Copyright 2008 JPMorgan Chase & Co., Jun. 2008. Retrieved from the Internet: <URL: https://www.jpmorgan.com/cm/BlobServer?blobcol=urldata&blobtable=MungoBlobs&blobkey=id&blobwhere=1158520944481&blobheader=application%2Fpdf&blobnocache=true&blobheadername1=Content-disposition&blobheadervalue1=attachment;filename=FirstCash-C_JPMA_Sec Features.pdf>, 2 pages.

Lee, Chern, 14.8 OpenSSH. FreeBSD Handbook [online]. Copyright 1995-2015 The FreeBSD Document Project [retrieved Feb. 4, 2015]. Retrieved from the Internet: <URL: https://www.freebsd.org/doc/handbook/openssh.html>, 7 pages.

New Security Token FAQs. maybank2u.com.sg [online]. Copyright 2015 Maybank, Malayan Banking Berhad, Sep. 4, 2014 [site visited Sep. 4, 2014]. Retrieved from the Internet: <URL: http://info.maybank2u.com.sg/eservices/personal/faq/faq-security-token.aspx>, 10 pages.

OTP c600 Secure Transaction Signing + OTP Mobile Token. Datasheet. rockey.com.my [online]. Softkey E-Solution SDN BHD [site visited Sep. 5, 2014]. Retrieved from the Internet: <URL: http://www.rockey.com.my/wordpress/one-time-password-authentication-token/otp-c600>, 2 pages.

Ricci, Antonio. 'Facing authentication threats: one time passwords and transaction signing.' Security Community Blog [online]. Copyright 2015 Symantec Corporation, Mar. 28, 2013 [site visited Sep. 4, 2014]. Retrieved from the Internet: <URL: http://www.symantec.com/connect/blogs/facing-authentication-threats-one-time-passwords-and-transaction-signing>, 4 pages.

SolidPass Frequently Asked Questions FAQ. solidpass.com [online]. SolidPass™ [site visted Sep. 4, 2014]. Retrieved from the Internet: <URL: http://www.solidpass.com/frequently-asked-questions-faq.html>, 3 pages.

YESsafe Mobile Token. Datasheet. i-sprint.com [online]. Copyright 2015 i-Sprint Innovations [site visited Sep. 4, 2014]. Retrieved from the Internet: <URL: http://www.i-sprint.com/wp-content/uploads/yessafe_token.asp>, 2 pages.

Youll "Fraud Vulnerabilities in SiteKey Security at Bank of America," http://cr-labs.com/publications/SiteKey-28068718.pdf (Jul. 18, 2006), 16 pages.

"Single Sign-On (SSO)" [site visited 20015-06-22] https://support.ca.com/cadocs/O/CA%20SiteMinder%2012%2052%20SP1-ENU/Bookshelf_Files/HTML/idocs/index.htm?toc.htm?256655.html?intcmp=searchresultclick&resultnum=817, 5 pages.

"Mapping Fed Authn Methods to Authn Levels in OIF / SP" http://prsync.com/oracle/mapping-fed-authn-methods-to-authn-levels-in-oif--sp-624805/ (Jul. 17, 2014), 5 pages.

Puhalla "OpenAM Session Upgrade" http://blog.profiq.cz/2012/09/21/openam-session-upgrade-overview/ (Sep. 21, 2012), 3 pages.

"OpenID Connect Single Sign-On (SSO)" Connect2id Ltd. http://connect2id.com/products/server/single-sign-on (Copyright 2015), 1 page.

"Configuring Authentication Mechanisms" SAP SE [site visited 20015-06-22] https://help.sap.com/saphelp_nw70ehp1/helpdata/en/8f/ae29411ab3db2be10000000a1550b0/frameset.htm 2 pages.

"Non-Final Office Action" issued in U.S. Appl. No. 14/920,807, dated Feb. 1, 2018, 19 pages.

U.S. Appl. No. 14/671,935, Final Office Action dated May 2, 2018, 6 pages.

U.S. Appl. No. 15/294,381, First Action Interview Pilot Program Pre-Interview Communication dated May 21, 2018, 6 pages.

U.S. Appl. No. 14/671,935, Notice of Allowance dated Oct. 22, 2018, 13 pages.

* cited by examiner

PROTECTION AGAINST END USER ACCOUNT LOCKING DENIAL OF SERVICE (DOS)

CROSS-REFERENCES TO RELATED APPLICATIONS

This application is a non-provisional application and claims the benefit and priority of U.S. Provisional Application No. 62/245,204, filed on Oct. 23, 2015, entitled "PROTECTION AGAINST END USER ACCOUNT LOCKING DENIAL OF SERVICE (DOS)," the content of which is herein incorporated by reference in its entirety for all purposes.

BACKGROUND

Generally, the present application relates to access management. More specifically, the application is related to techniques for protecting against denial of access by accounts providing access to resources.

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those whom he reports to.

Earlier less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular resource. Upon making a determination that access should be granted, a token is provided to a client (e.g., client application at a device) of the requestor. This token is like a key that can be used to open a door that guards restricted data. For example, a user may attempt to access a human resources database to gather information about certain employees such as salary information. The user's web browser at a client makes a request to the application, which requires authentication. If the web browser does not have a token, the user is asked to log in to the access management system. When the user is authenticated, the user's browser at the client receives a token that may be used to access the human resources application.

In an enterprise, users (e.g., employees) typically may have access to one or more different systems and applications. Each of these systems and applications may utilize different access control policies and require different credentials (e.g., user names and passwords). A user wanting to access multiple resources protected by an access management system may need to be authenticated by credentials provided to the access management system. A successful authentication gives the user authorization to access the protected resources, based on their assigned access privileges.

If a user wants to access multiple resources protected the access management system, the access management system may determine whether the user is authenticated to access the multiple resources requested by a user. In some instances, authentication of a user for one resource may suffice for accessing other resources, otherwise the access management system may request additional credentials from the user. Upon authentication to access multiple resources, the user may not need to re-authenticate to access additional resources. In such instances, the access management system may maintain a single session, such as a single sign-on session (SSO), which provides a user with access to multiple resources after authentication.

Regardless of a type of session, an access management system may prevent brute-force discovery of user passwords for a user's account. For example, an access management system may prevent a user from gaining access to a user's account (i.e., by locking the user's account) upon determining that the user has attempted to gain access a threshold number of times. A user who does not own the account can cause the access management system to lock a genuine owner's account by forcing a denial of access, such as denial of service (DOS). For example, a hacker can try multiple login attempts to access an account until a threshold number of attempts occurs, after which access to the account is denied. A genuine owner of a locked account may have to perform several steps to unlock the account. Denial of access to important accounts, such as a VPN account or an administrative account, can cause significant loss of use of the account and inconvenience to the genuine owner of the account.

BRIEF SUMMARY

The present disclosure relates to an access management system. Specifically, techniques are disclosed for protecting access by an access management system from being locked, such that access may not be denied.

An access management system can provide features that enable an owner of an account to prevent the account from becoming locked. Specifically, the techniques disclosed herein enable an account holder to circumvent procedures of the access management system that lock an account after several unsuccessful attempts to access the account.

An access management system may operate according to a configuration for managing access to account. The access management system can manage access to an account by presenting a user with an interface to receive access information (e.g., account information and credential information) for the account. The access management system can deny access to an account upon determining that the credential information is not correct for the account. For example, the access management system may deny access to an account upon determining that a threshold number of unsuccessful attempts to access the account has been satisfied. An interface may be presented to the user indicating that access to the account is denied.

An access management system can prevent an account from becoming locked after the occurrence of several unsuccessful attempts to access the account. The access management system can provide a mechanism by which an owner of the account can by-pass a procedure to lock the account when a threshold number of unsuccessful attempts has been reached. For example, upon determining that the threshold number of unsuccessful attempts has been satisfied, the access management system can enable the owner of the account to provide additional access information (e.g., a one time password). The additional access information may be provided to the owner of the account to prevent a malicious user from accessing the account. Based on a profile of the owner, the access management system may generate the additional access information. The additional access information may be temporary, such that it is associated with one or more constraints (e.g., time limit). For example, the additional access information may include a one-time password (OTP).

The additional access information may be sent to the owner of the account via an out-of-band communication channel, such as at a device different from that which was used to unsuccessfully access the account. For example, the additional access information may be sent to the owner of an account via an email system or other communication system (e.g., a short messaging system). In some embodiments, upon satisfaction of the threshold for unsuccessful attempts for an account, the access management system may generate a notification to be sent to the owner of the account via an out-of-band channel. The access management system can automatically send the additional access information upon determining that the threshold number of unsuccessful attempts has been satisfied. Sending the additional access information may serve as a notification that a malicious user may be attempting to access the account.

The access management system can provide an interface at a client device to receive the additional access information from the owner. Upon determining that the temporary access information is correct and valid based on the constraints, the access management system may perform usual operations to manage access to the account. For instance, the access management system may present an interface to receive account information and/or credential information. Access to the account may be granted upon verification of the account information and/or credential information. Upon determining that the temporary access information is not correct and/or does not satisfy the constraints, the access management system may prevent access to the account (i.e., lock the account). Users that cannot present the additional access information may be denied access to the account. The access management system may be configured to lock the account based on the number of attempts to provide the additional access information.

In some embodiments, the access management system may maintain data in a profile associated with an owner of an account. The data may include information indicating details about additional access information sent to the owner. The data may be updated to indicate whether the additional access information was sent to an owner of the account and other information (e.g., time and destination) related to sending the additional access information. The access management system may update the data to indicate whether access to the account has been granted using the additional access information.

The techniques disclosed herein provide many advantages over existing access management systems. The mechanism to provide additional access information may prevent malicious users from locking a user account without compromising the strength of an access management system's account management policies. The additional access information provided via an out-of-band channel may enable a genuine user to access an account despite several unsuccessful attempt by any user to access the account. Receipt of the additional access information may readily give an alert to an account owner that someone is attempting to access an account without authorization. Based on the alert, the user can take action (e.g., modify access information for the account) to prevent subsequent attempts by a malicious user to access the account.

In some embodiments, an access management system may include a computer system that is configured to implement methods and operations disclosed herein. A computer system may include one or more processors and one or more memory accessible to the one or more processors and storing one or more instructions which, upon execution by the one or more processors, causes the one or more processors to implement methods and/or operations disclosed herein. Yet other embodiments relate to systems and machine-readable tangible storage media which employ or store instructions for methods and operations disclosed herein.

In at least one embodiment, a method may include determining that an access threshold has been satisfied, the access threshold being based on a maximum number of unsuccessful attempts to obtain access on behalf of a user from a device via the access management system. The method may include generating the first temporary access information. The first temporary access information may be a password that is associated with a time period. The method may include sending, to a destination associated with the user, first temporary access information for the user to authenticate the access management system. In some embodiments, the device is a first computing device and the destination is a second computing device that is different from the first computing device. The destination can also be an email address or a telephone number accessible using a mobile device. The method may include sending to the device a request for the first temporary access information. The method may include receiving, from the device, second temporary access information. The method may include determining whether the second temporary access information matches the first temporary access information sent to the destination. The method may include, upon determining that the second temporary access information matches the first temporary access information sent to the destination, sending a message to the device, the message causing the device to enable the user with access from the device to a resource. The method may include, upon determining that the second temporary access information does not match the first temporary access information sent to the destination, sending a message to the device, the message causing the device to prevent the user with future access from the device to the resource.

In some embodiments, the method may include: upon determining that the access threshold has been satisfied: sending to the device a request for credential information to enable the user to request access; receiving the credential information from the device; and authenticating the user based on the credential information. The user may be enabled to with access from the device to the resource further upon determining that the user is authenticated based on the credential information. The user may be prevented with future access from the device to the resource upon determining that the user cannot be authenticated based on the credential information.

In some embodiments, a resource is accessed based on an account managed by the access management system. The account may provide access to the resource that is enabled by the access management system.

In some embodiments, the method may include generating a graphical interface to receive access information to determine access from the device to the resource; and sending the graphical interface to the device. The device may display the graphical interface. The device may receive the first temporary access information as input by the user through the graphical interface. The first temporary access information that is received by the device may be sent by the device as the second temporary access information that is received from the device.

In some embodiments, the method may include storing data in association with information about the user upon sending the first temporary access information to the destination. The method may include updating the data to indicate that the second temporary access information was received. The method may include upon determining that the second temporary access information matches the first temporary access information sent to the destination, updating the data to indicate that the user is enabled to request access on behalf of the user from the device via the access management system. The method may include receiving, from the device, a new request for access on behalf of the user; and enabling the new request for access based on the data indicating that the user is enabled to request access on behalf of the user from the device via the access management system. The method may include upon determining that the second temporary access information does not match the first temporary access information sent to the destination, updating the data to indicate that the user is prevented from future attempts to obtain access on behalf of the user from the device via the access management system. The method may include receiving, from the device, a new request for access on behalf of the user; and preventing the new request for access based on the data indicating that the user is prevented from future attempts to obtain access on behalf of the user from the device via the access management system.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The present disclosure relates generally to providing single sign-on (SSO) access. A SSO session may provide a user with access to one or more systems after authentication of credential information (e.g., a username and a password). Access to a system may provide access to one or more resources. Resources may include any item managed and/or stored by a computing system, such as an application, a document, a file, electronic content, and/or the like. A resource may be identified by a uniform resource locator (URL) or other data indicating a source of the resource.

Certain techniques are disclosed for protecting a user from denial of service (DOS) to access an account of the user that has been locked. An access management system can provide features that enable an owner of an account to prevent the account from becoming locked. Specifically, the techniques disclosed herein enable an account holder to circumvent procedures of the access management system that lock an account after several unsuccessful attempts to access the account.

Figure 1:
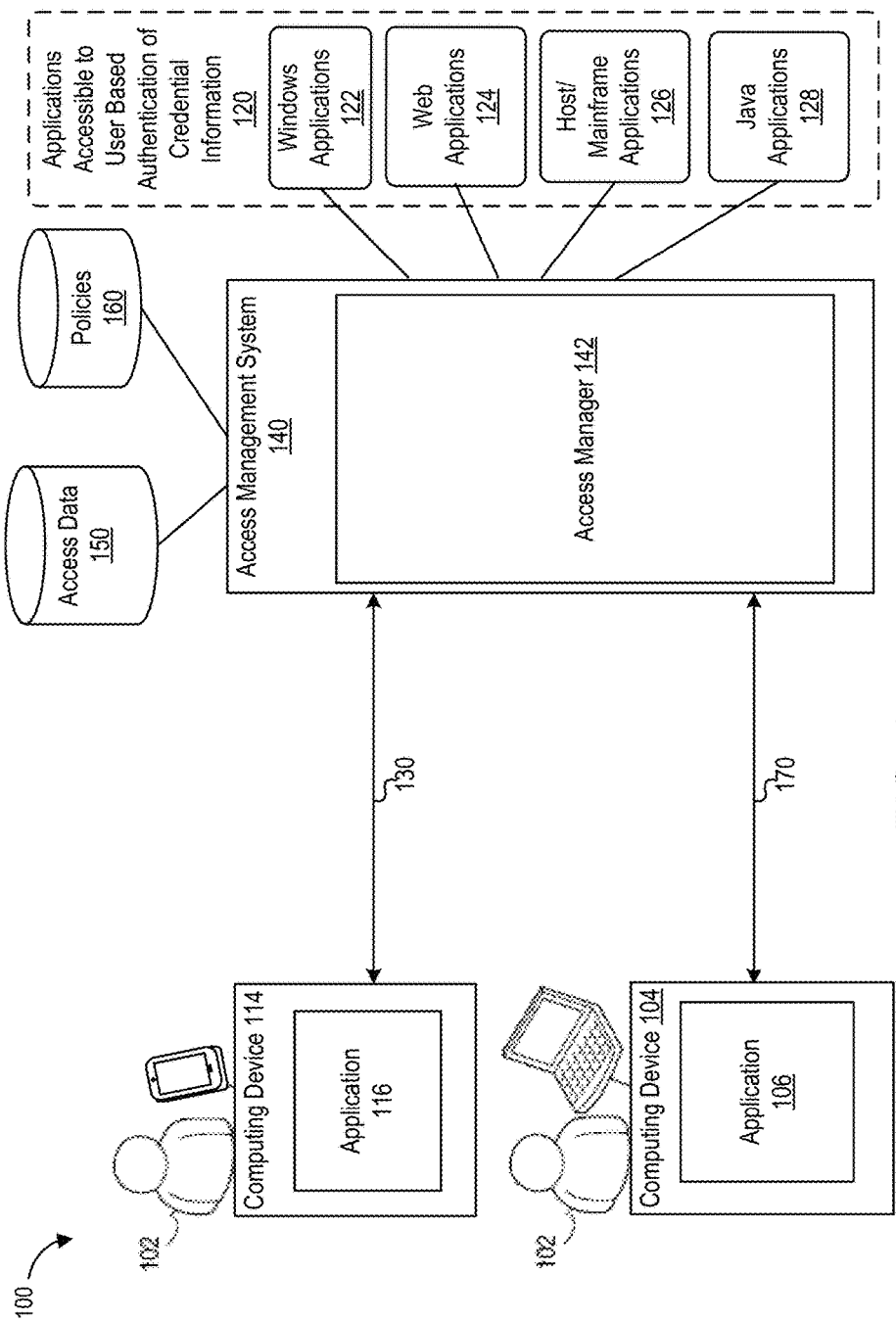
FIG. 1 illustrates a high-level diagram of a system for preventing denial-of-service (DOS) for access by an access management system, in accordance with an embodiment.

Some embodiments, such as systems, methods, and machine-readable media are disclosed for protecting a user from denial of service (DOS) to access his/her a resource that has been locked. FIG. 1 illustrates a system 100 in which a user (e.g., user 102) operating a client (e.g., computing device 104 or application 106 executing on computing device 104) can prevent his or her access from being denied based on unsuccessful attempts to access one or more resources. Access may be to a resource, an account, or other data that can be controlled by authentication. For purposes of illustration, "session" as described herein includes an SSO session; however, a session may include other types of sessions enabling access to a user. Access management system 140 may provide access one or more resources. Access management system 140 may implement a sign-on system, e.g., a SSO system, which can establish an SSO session to provide SSO access to one or more resources.

Resources may include, without restriction, a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource server that provides access to one or more resources upon authentication of user 112 in a SSO system.

Access management system 140 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof.

In some embodiments, access management system 140 may be implemented by multiple computing devices (e.g., access manager servers) deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 140.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include access manager 142, which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Each of computing devices 104, 114 may communicate with access management system 140 via one or more communication networks. Access management system 140 may communicate with computing device 104 via one or more communication networks 170. Access management system 140 may communicate with computing device 114 via one or more communication networks 130. Examples of communication networks may include a mobile network, a wireless network, a cellular network, a local area network (LAN), a wide area network (WAN), other wireless communication networks, or combinations thereof.

FIG. 1 shows an example in which user 102 can engage in communication with access management system 140 to prevent his access from being denied based on his actions at a client (e.g., computing device 104). In this example, user 102 operating computing device 114 may attempt to access a resource such as an application 106, e.g., any one of applications 120 or the resources accessible through applications 120. Applications 120 may be accessible to user 102 upon successful authentication of credential information for user 102. User 102 may attempt to provide credential information, which after several unsuccessful attempts, the user 102 may be denied access. Access may be denied based on an access threshold number of attempts being satisfied. Access management system 140 can communicate with a destination, e.g., client device 114, to provide the user with temporary access information, which the user can provide to the access management system at computing device 104 to prevent his access from being denied.

In attempting to access an application, user 102 may operate an application (e.g., application 106) that manages access to a user's account via access management system 140. For example, application 106 is an access management application that may present GUIs, such as those depicted in FIGS. 4-5. Access management system 140 may provide many SSO services including management of access (e.g., granting/denying access) to resources, automatic sign-on, application password change and reset, session management, application credential provisioning, as well as authentication of a session. In some embodiments, access management system 140 can provide automatic single sign-on functionality for applications 120, such as Windows® applications, Web application, Java® applications, and mainframe/terminal-based applications running or being accessed from client devices. As explained above, access management system 140 may perform authentication of a user (e.g., user 112) operating a client device (e.g., computing device 114). Authentication is a process by which a user verified to determine that he/she is who he/she claims to be.

In some embodiments, access management system 140 may use one or more policies stored in a data store 160 ("policies") to control access to resources. Policies 160 may include an authentication policy that specifies the authentication methodology to be used for authenticating the user for whom the access must be provided on a given resource. Policies 160 define the way in which the resource access is to be protected (e.g., type of encryption, or the like). Policies 160 may include an authorization policy that specifies the conditions under which a user or group of users has access to a resource. For example, an administrator may only authorize certain users within a group to access particular resources. Access management system 140 may determine authentication for an SSO session based on one or more of policies 160.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to or includes one or more data stores for storing data such as access data 150 and policies 160. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Access manager 142 may handle processing to determine whether a session has been established for user 112 to access a resource. Access manager 142 can check for a existing, active ("valid") session for user 112 to access a requested resource that is protected. Access manager 142 may assess validity of a session for user 112 based on consideration of one or more access policies applicable to user 112. Based on determining that a valid session does not exist for user 112, access manager 142 may request credential information ("credentials") from user 112. Successful authentication of the credential information may provide the user with access to one or more resources, which may include a requested resource.

A request may be communicated to computing device 114, which in response, prompts user 112 for user credentials to determine authentication of a session. The request may include information (e.g., a URL) to a web page or a user interface (e.g., a web page, portal, or dashboard) to receive credential information. The request may be communicated to computing device 114, which in response prompts user 112 for user credentials to determine authentication of a session. Access manager 142 may perform operations to authenticate credential information for user 112. In some embodiments, access manager 142 may store information about sessions established upon successful authentication of a user. For a SSO session (e.g., SSO authenticated sessions), the SSO session may be managed as a SSO session enabling access to all resources accessible to user based upon successful authentication of credential information for a user. Access manager 142 can determine resources that are protected and based on authentication sessions, can determine resources that are permitted and/or restricted for a session.

Communications between computing devices 104, 114 and access management system 140 can be received through a gateway system. The gateway system may support access management services. The gateway system may support access management services. For example, a single sign-on (SSO) gateway may implement one or more access agents, such as agent (e.g., web gate agent), to balance and/or handle requests from clients and access management system 140. In some embodiments, access management system 140 may be implemented in system 100 according to an agent-server model for communication between computing devices 114, 104 and any one of access manager servers implemented for access management system 140. The agent-server model may include an agent component (e.g., a gateway system) and a server compontent. The agent component may be deployed on a host system and the server component may be deployed on a server, e.g., an access manager server. Computing device 114 may be a workstation, personal computer (PC), laptop computer, smart phone, wearable computer, or other networked electronic device.

Access management system 140 may present user 112 with a request for authentication credentials in the form of a challenge (e.g., via the user's web browser at computing device 114). In some embodiments, user 112 can access an interface to manage a session (e.g., "SSO user interface") through a client executing on computing device 114 or through a web browser on computing device 114. The SSO user interface may be implemented at access management system 140. Access management system 140 may send the SSO user interface or information (e.g., a URL) enabling access to the SSO user interface.

In some embodiments, an SSO user interface can include a list of the applications user 112 commonly utilizes. User 112 can manage their credentials and policies associated with applications through the SSO user interface. When user 112 requests to access an application, e.g., application 140, through the SSO user interface, a request may be sent from computing device 114 to access management system 140 to determine a policy type for the application from one or more policies 160 applicable to user 112. Access management system 140 may determine whether a valid session exists for the user and if so, then it can determine user's 102 credential information based on the policy type.

In some embodiments, the request may include an authentication cookie from a previous login that can be used to determine whether user 112 is authorized to retrieve the credential. If authorized, the user can be logged into the application using the credential. In some embodiments, agent can enable users to access applications 120 using SSO services provided by access management system. Access may be provided through a web browser directly, without first accessing the SSO user interface or using a client executing on computing device 114. If user 112 is not authorized, then access management system may request credentials from user 112. The SSO user interface may present an interface to receive input including credential information. The credential information may be sent to access management system 140 to determine authentication of user 112.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

Figure 2:
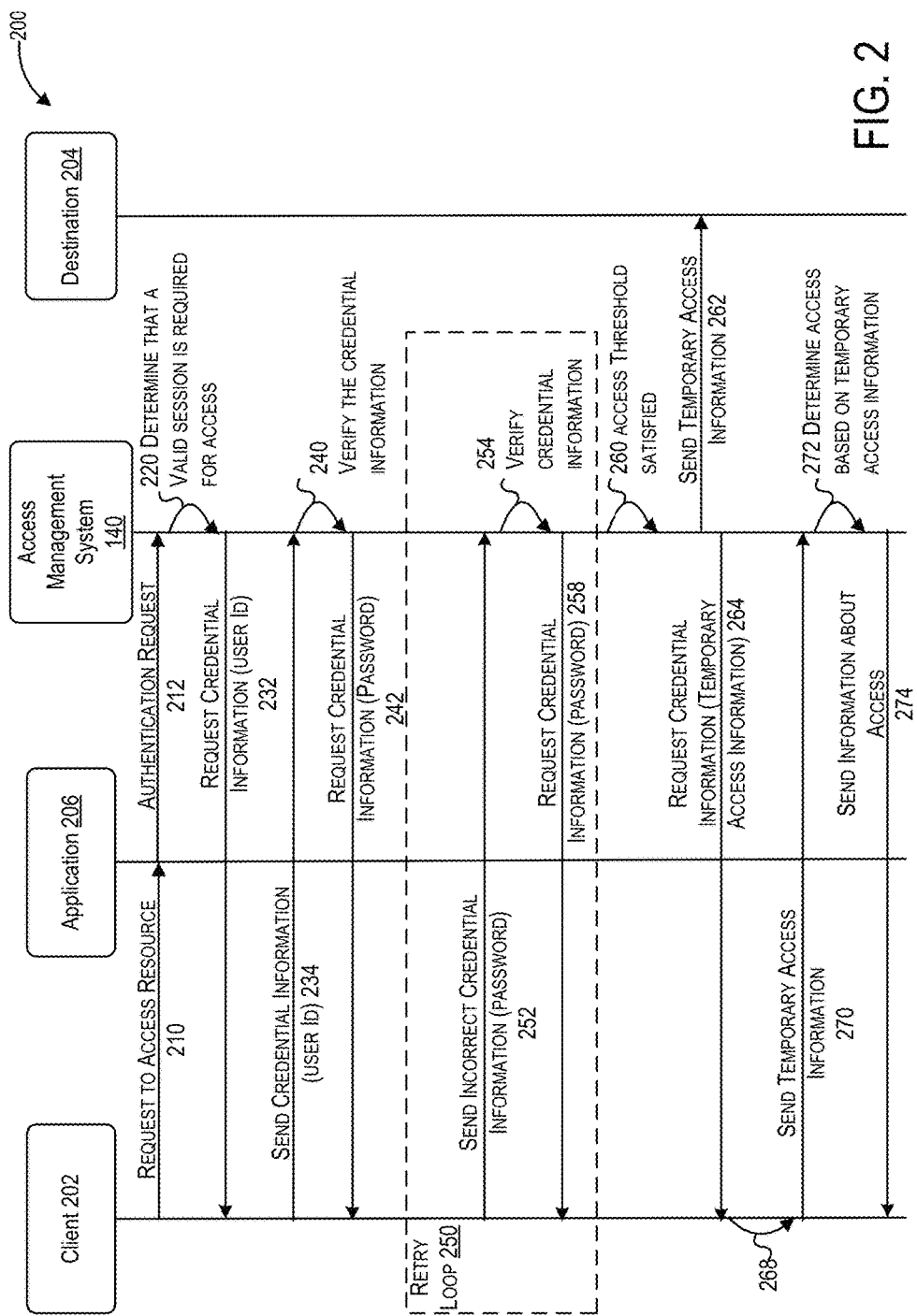
FIGS. 2 and 3 illustrate sequence diagrams showing operations for preventing denial-of-service (DOS) for access by an access management system, in accordance with an embodiment.
Figure 3:
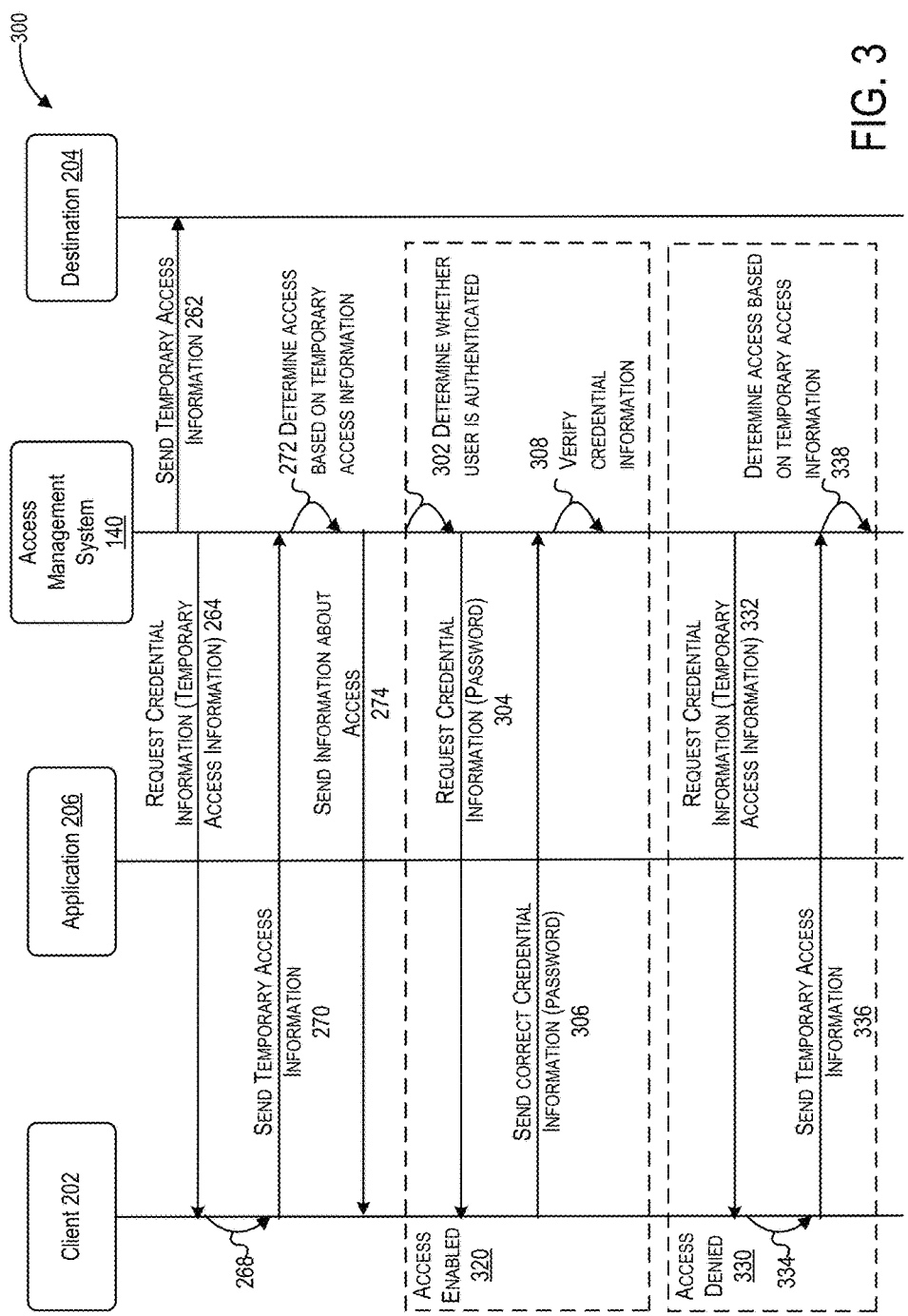
Figure 6:
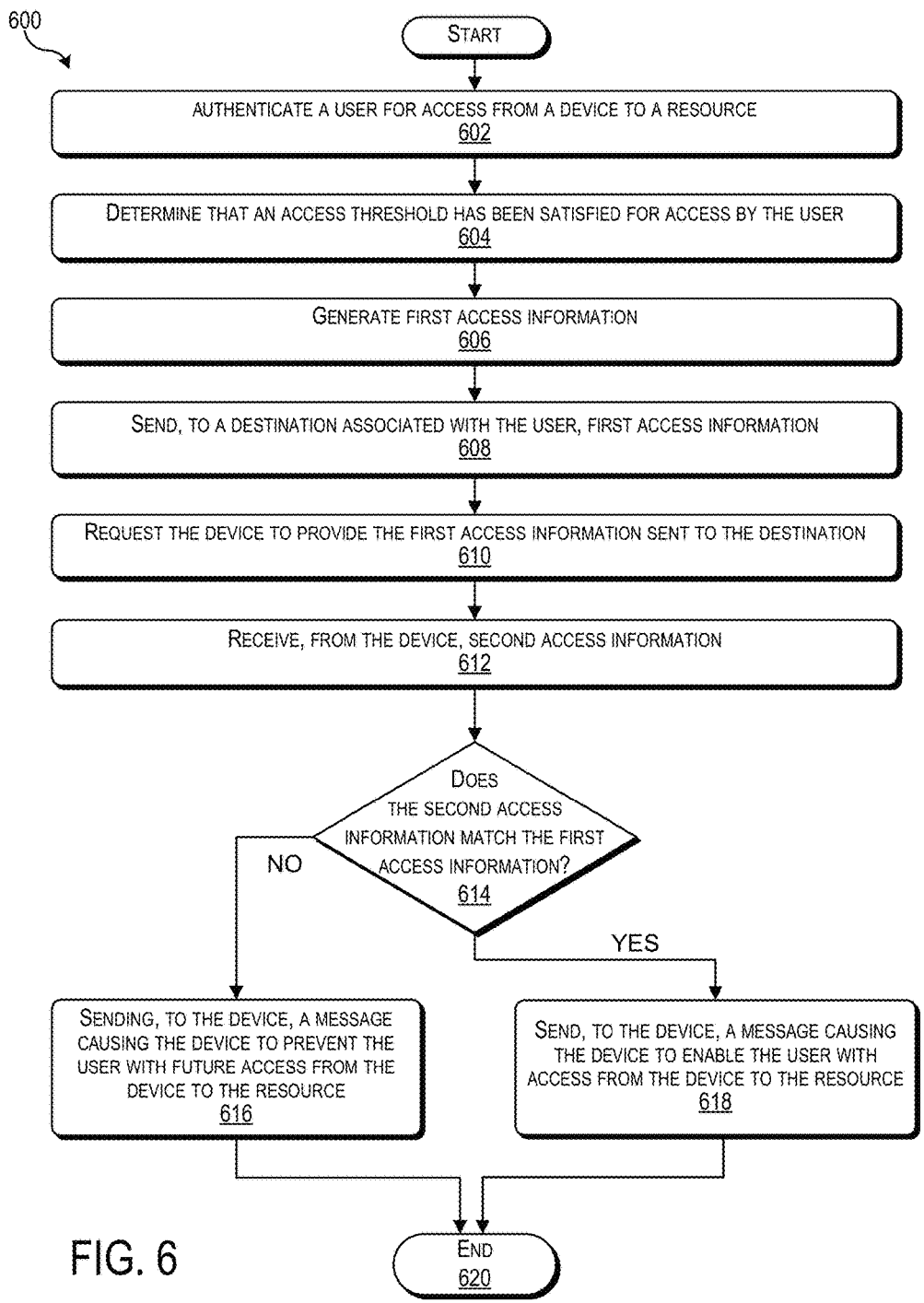
FIG. 6 illustrates a flowchart of a process for preventing denial-of-service (DOS) for access by an access management system, in accordance with an embodiment.

Now turning to FIGS. 2, 3, and 6 examples are shown of a sequence of operations for preventing denial-of-service (DOS) for access by an access management system (e.g., access management system 140, in accordance with an embodiment. The operations described with reference to access management system 140 may be implemented by access manager 142, or multiple modules or blocks in access management system 140.

In some embodiments, such as those described with reference to FIGS. 2, 3, and 6, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to FIGS. 2, 3, and 6 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of an access management system, e.g., access management system 140 of FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. While processing depicted in FIGS. 2, 3, and 6 may be described with respect to access to an account, such processing may be performed for access defined for a user, such as access to resources, such that the processes described in these figures may be implemented multiple times. Furthermore, additional steps may be added or removed depending on the particular applications. One of ordinary skill in the art would recognize many variations, modifications, and alternatives.

In an aspect of some embodiments, each process in FIGS. 2, 3, and 6 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

FIG. 2 illustrates a sequence diagram 200 of operations for preventing DOS for access by an access management system, in accordance with an embodiment.

Starting at step 210, a client operated by a user requests access to a resource ("requested resource") for which access is managed by access management system 140. However, in some instances, an unauthorized user (e.g., a hacker) may maliciously attempt to gain access to a resource using an account of another user ("authorized user") with authorization. As such, in the example of FIG. 2, an unauthorized user may operate client 202 to access a resource, such as application 206.

As explained above, a resource may be an application or a resource accessible using an application. In the example of FIG. 2, client 202 may be operated to request access to a resource through application 206. At step 212, application 206 may request ("authentication request") access for a resource requested by client 202. Application 206 may be an access management application that manages access by communicating with access management system 140. A user can provide access credentials via application 206 to the access management system for authentication of the user. Access management system 140 may establish a session (e.g., a SSO session) upon successful authentication of the user. The session may enable user to access one or more resources from client 202.

Access management system 140 may handle authentication of client 202 to establish a session. Upon receiving a request to access a resource, access management system 140 may determine whether a valid session is required to access the resource, at step 220. For example, access management system 140 may determine whether access to the resource is protected. Access to a resource may be based on authentication of the user. Access management system 140 may determine whether a valid session is active for the user. The existence of a valid session may indicate that the user has been authenticated. Access management system 140 may determine whether the active session enables access to a resource such as the requested resource. In some embodiments, authentication may be specific to certain resources. In some embodiments, access management system 140 may assess the validity of a session for a user based on consideration of one or more access policies applicable to the user.

At step 220, access management system 140 may determine that the user is not authenticated to access the requested resource. Access management system 140 may determine that a user is not authenticated by determining that a valid session does not exist for the user. Upon determining that the user is not authenticated to access a resource, access management system 140 may send a request to client 202 for credential information. In some embodiments, credential information such as user identification and a password may be requested in one or more communications to client. Access management system 140 may implement one or more authentication processes for determining authentication of a user. The authentication process(es) may include known authentication processes. The request may be for any type of information to implement the authentication process(es) to authentication the user.

At step 232, access management system 140 may request user identification information from the user at client 202. At step 234, client 202 may present an interface to obtain user identification information. Client 202 may send the identification information to access management system 140. At step 240, access management system 140 may verify whether the user identification information is valid. Upon determining that the user identification information is valid, access management system 140 may request for credential information such as access information (e.g., a password), at step 242. The request may be for any information needed to determine authentication based on one or more processes for authentication of the user.

In response to a request for user credentials, client 202 may provide an interface that enables client 202 to receive input for authentication. The input may be credential information where authentication is based on determining credential(s) for the user. The interface may be provided in an application, e.g., application 206. An example of the interface is described below with reference to FIG. 4. In one example, an unauthorized user may attempt to access a resource of a user by trying different credential information through a variety of techniques, including brute force. In retry loop 250, a user operating client 202 may try to access the resource through several attempts to provide credential information unsuccessfully. For example, at step 252, a user may try to provide incorrect credential information (e.g., a password) to access management system 140 via an interface shown in FIG. 4. At step 254, in retry loop 250, access management system 140 may verify whether the credential information matches that of an account associated with an authorized user corresponding to the user identification information provided at step 234. Upon determining that the credential information is not valid (e.g., not correct), access management system 140 may request credential information again from the user at step 258.

Retry loop 250 may be implemented according to one or more criteria, such as an access threshold. Retry loop 250 may be implemented until the criteria are satisfied. Access management system 140 may be configured to limit retries to provide credential information until a maximum number of unsuccessful attempts has occurred. At step 260, access management system 140 may determine that the criteria (e.g., an access threshold) has been satisfied. The access threshold may be based at least in part on a maximum number of unsuccessful attempts to obtain access on behalf of a user from client 202 via the access management system 140.

Access management system 140 may be configured to initiate a process by which a user can prevent DOS for access by the access management system 140. Access management system 140 may generate access information. The access information may be associated with one or more criteria, e.g., such as a time period. The access information may be temporary such that it is valid according to the criteria.

At step 262, access management system 140 can generate access information, such as temporary access information that is valid for a time period to ensure security for preventing DOS. The access information may be generated based on information about the user that may not be known to unauthorized users. The access information may be encrypted using an encryption process. Client 202 may be provided with information unaccessible to an unauthorized user. The information may be useable by client 202 at a later time when it receives the temporary access information input by a user as obtained from a destination. The information may be used to decrypt the temporary access information before sending to access management system 140. In some embodiments, access management system 140 can decrypt the access information upon receipt from client 202, so no user can decipher the access information. The access information may be generated using one or more random number or data generation techniques.

At step 262, temporary access information (e.g., first temporary access information), such as a one-time password, may be sent to destination 204 associated with user. Sending the temporary access information to destination 204 associated with an authorized user, enables the authorized user to be notified that someone has attempted to unsuccessfully access a resource based on the user's access rights. The notification may also provide warning to the user if the user, who is authorized, was unsuccessful in accessing a resource.

In some embodiments, access management system may store data ("access data") in association with information about the user upon sending temporary access information to the destination. The data may be stored in a user identity profile, with an attribute indicating that temporary access information was sent to the user.

The temporary access information may be generated by an access management system and/or may be obtained from a third party system. In some embodiments, temporary access information may be generated in advance. The temporary access information may be associated with one or more criteria that limit use of the temporary access information.

The temporary access information may be sent to the user at one or more destinations identified based on the communication preferences of the user with authorization to access the resource. As explained above, the communication preferences may be retrieved using the user identification information. In some embodiments, a destination may include client 202 that requested accessed to a resource. By default (e.g., when the user has not provided communication preferences), the temporary access information can be sent to the client 202. Temporary access information may be communicated to destination 204 using one or more communication systems, e.g., a messaging service. In the example shown, destination 204 may be a location that is different from client 202.

A destination may not be physically located with client device 104. Destinations may correspond to a location, such as an email address or a telephone number, at which data can be communicated from and/or received. A destination may be accessible to a user operating client device 104 such that the user can facilitate validation of access management system 140. A destination may enable a user to receive information from and/or send information to access management system 140.

Communication with a destination may be considered out-of-band such that the communication is with a device that is not client 202 and/or that a different communication mechanism is used than communication with client 202. Communication with a destination may enable secure communication of information for preventing DOS to prevent unauthorized users from inhibiting access to an authorized user. Destinations may correspond to a location, such as an email address or a telephone number, at which data can be communicated from and/or received. A destination may be accessible to an authorized user such that the user can facilitate communication with access management system 140 to prevent DOS to the user's account. A destination may enable a user to receive information from and/or send information to access management system 140.

In the example of FIG. 2, at step 264, access management system 140, may send a request to client 202 for temporary access information that was sent to the destination. In some embodiments, access management system 140 may generate and provide (e.g., send) a graphical interface to receive the temporary access information to determine access from client 202 to a resource. The graphical interface may be sent with the request or as a separate communication.

Figure 5:
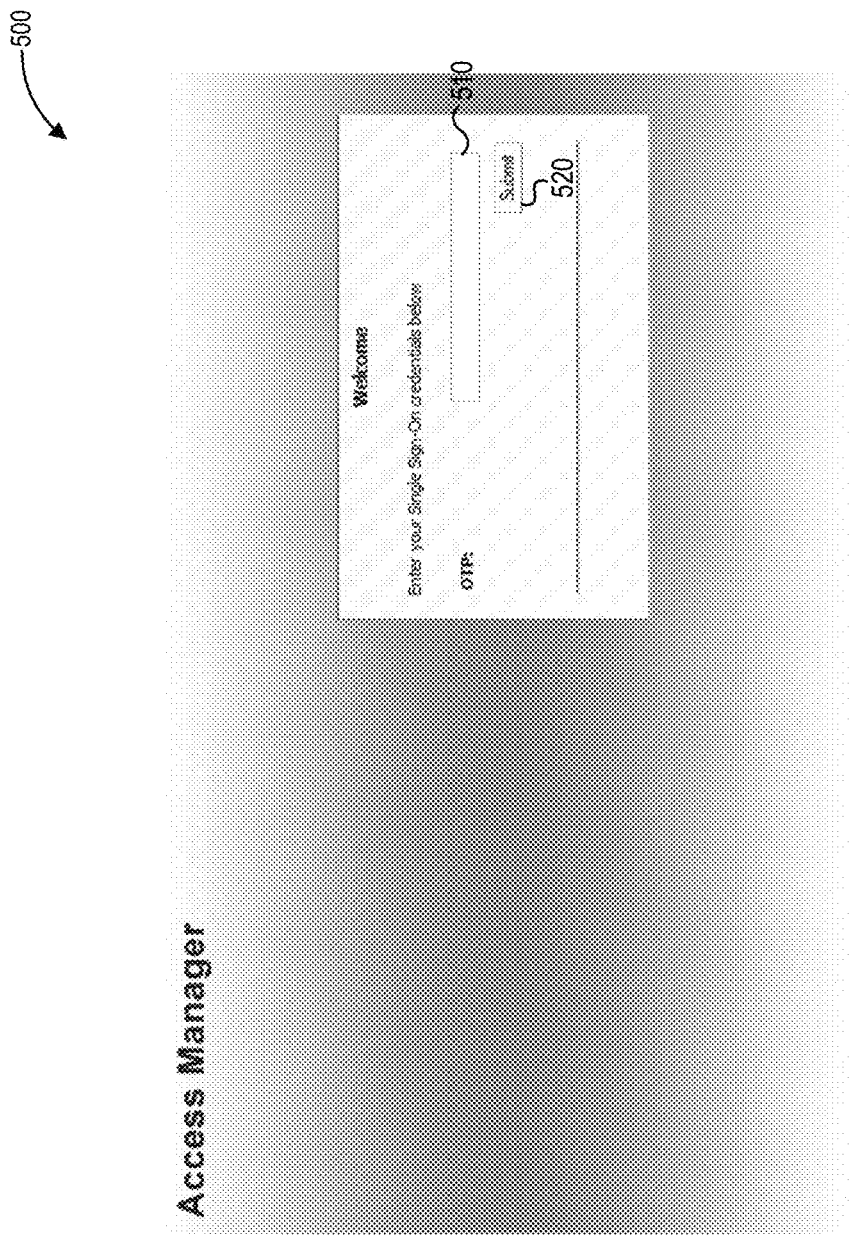

At step 268, client 202 may present an interface, e.g., interface in FIG. 5, to receive temporary access information. The interface may be received or accessed from access management system 140. Client 202 can receive temporary access information as input by the user through the graphical interface. The temporary access information may be obtained from destination 204 or the destination may be accessed using client 202. If a user is unauthorized, he may not have access to the temporary access information sent to a destination associated with an authorized user. If the user of client 202 is authorized, the user may access the temporary access information at destination 204 or may operate client 202 to request the temporary access information from destination 204. At step 270, a user of client 202 may submit temporary access information (e.g., second temporary access information). It may or may not be valid depending on who the user is. Client 202 may send the second temporary access information to access management system 140. The temporary access information, if accessible from the destination, may be the second temporary access information received by access management system 140 from client 202.

At step 272, access management system 140 may determine whether the user operating client 202 is to be prevented from access (e.g., locked out) or to be enable with access to authenticate. Access management system 140 may determine whether the second temporary access information received from client 202 matches the first temporary access information sent to destination at 262.

Access management system 140 may update access data stored for the user to indicate that the temporary access information was received, regardless of whether it is valid.

At step 272, upon determining that the received temporary access information matches the temporary access information sent to the destination 204, access management system 140 may enable the user of client 202 to obtain access via an authentication process. The authentication process may include steps 220, 232, 234, 240, 242, and other steps including client 202 submitting credential information to access management system 140 upon request. Upon determining that the received temporary access information matches the temporary access information sent to the destination 204, the access data may be updated to indicate that the user is authenticated, such that the client is enabled to request access on behalf of the user from the client 202 via the access management system 140. The access data may updated with information indicating the resources permitted to be accessed based on the user being authenticated at client 202. In some embodiments, an access policy may be associated with the access data to determine the scope of access (e.g., accessible resources) based on authentication of the user at client 202.

With access enabled, the user can request access to resources through a normal authentication process by access management system 140. In the future, when access management system 140 receives a new request from client 202 to access a resource, access management system 140 may enable the new request for access based on the access data indicating that the user is enabled to request access on behalf of the user from the client 202. As such, access management system 140 may initiate an authentication process. In some embodiments, one or more requests may be received after the request at step 210. The requests may be received on behalf of the user. The access management system 140 may determine whether client 202 from which the requests are sent are enabled with access to a resource of each of the requests. Access management system 140 may check access data to determine whether access is permitted to the resource. Access may be enabled upon determining that the user has been authenticated and that the account is not locked. Access management system 140 may prevent subsequent requests for access based on the access data indicating that the user is prevented from access by the user at client 202. This means that future attempts to obtain access on behalf of the user from client 202 via the access management system 140 will not be permitted.

Upon determining that the received temporary access information does not match the temporary access information sent to the destination 204, access management system 140 may prevent future attempts to obtain access on behalf of an authorized user. Upon determining that the received temporary access information does not match the temporary access information sent to the destination, access management system 140 may update the access data to indicate that the user is prevented from future attempts to obtain access on behalf of the user from the client via the access management system. In the future, when access management system 140 receives a new request from client 202 to access a resource, access management system 140 may prevent the new request for access based on the access data indicating that the user is prevented from future attempts to obtain access on behalf of the user from the client via the access management system.

In some embodiments, at step 274, access management system 140 may send a message to client 202 with information as to whether the client is enabled or denied from accessing a resource. The message may include a request for credentials to authenticate the user. The message may indicate whether the user's account is locked or unlocked. The message may include one or more instructions (e.g., code) or other information to instruct the client to determine whether to enable or deny access to the resource.

Continuing from the example in FIG. 2, FIG. 3 illustrates a sequence diagram 300 of operations performed for preventing denial of service for access. FIG. 3 illustrates steps 262, 264, 268, 270, 272, and 274 of FIG. 2. Access management system 140 may send temporary access information to a destination to enable an authorized user of the account to prevent access from being denied.

In some embodiments, access management system 140 perform operations after step 272, where the user of client 202 is enabled to obtain access via an authentication process. Such operations may be performed when access is enabled 320 ("access enabled") based upon step 274. Upon access being enabled for the user at client 202, at step 302, access management system 140 may determine whether the user is authenticated to access a resource after being enabled for authentication. Upon determining that the user has not authenticated, access management system 140 may send a request to client 202 for credential information (e.g., a password), at step 304.

At step 306, client 202 may send credential information to access management system 140. The credential information, if valid, may enable client 202 to access the resource upon authentication of the user based on the credential information. At step 308, access management system compared the credential information to credential information previously provided for the user. If matching, access management system 140 may enable client 202 with access to the resource.

In some embodiments, access management system 140 performs operations after step 272, where the user of client 202 is enabled to obtain access via an authentication process. At step 302, access management system 140 may determine whether the user is authenticated to access a resource after being enabled for authentication at step 272. Upon determining that the user has not been authenticated, access management system 140 may send a request to client 202 for credential information (e.g., a password), at step 304. At step 306, the user operating client 202 may provide credential information to the client, which sends the credential information to access management system 140. At step 308, access management system may verify the credential information to determine whether it matches the credential information stored the user. Access management system 140 may store information in access data indicating that the user is authenticated. A session may be established for the user based on authentication of the user. The session may be established based on determining that the credential information received from client 202 matches the credential information stored the user.

In some embodiments, access management system 140 performs operations after step 272, where the user of client 202 is not enabled to obtain access via an authentication process. Such operations may be performed when access is enabled 330 ("access denied") based upon step 274. Based upon determining at step 272, that the temporary access information does not match that which was sent to destination 204, access management system 140 may prevent the client 202 from authentication. During access denied 330, access management system 140 may send another request for temporary access information to enable the client 202 to provide the temporary access information again. In some embodiments, access management system 140 may send new temporary access information to destination 204. At step 334, client 202 may request the temporary access information from the user. At step 336, the user may submit the temporary access information. At step 338, access management system 140 may determine whether the temporary access information received matches that last temporary access information that was sent to destination 204. Access denied 330 may be repeated.

Access management system 140 may store access data about access for the user. The access data can be used by access management system 140 to later determine, upon request, whether access is denied or enable. Access management system 140 may send a message to the client. The message may include one or more instructions (e.g., code) or other information to instruct the client to determine whether to enable or deny access to the resource. An application on the client may change operation based on the message. The application may control access via access management system based on whether access is to be denied or enabled for the user.

Figure 4:
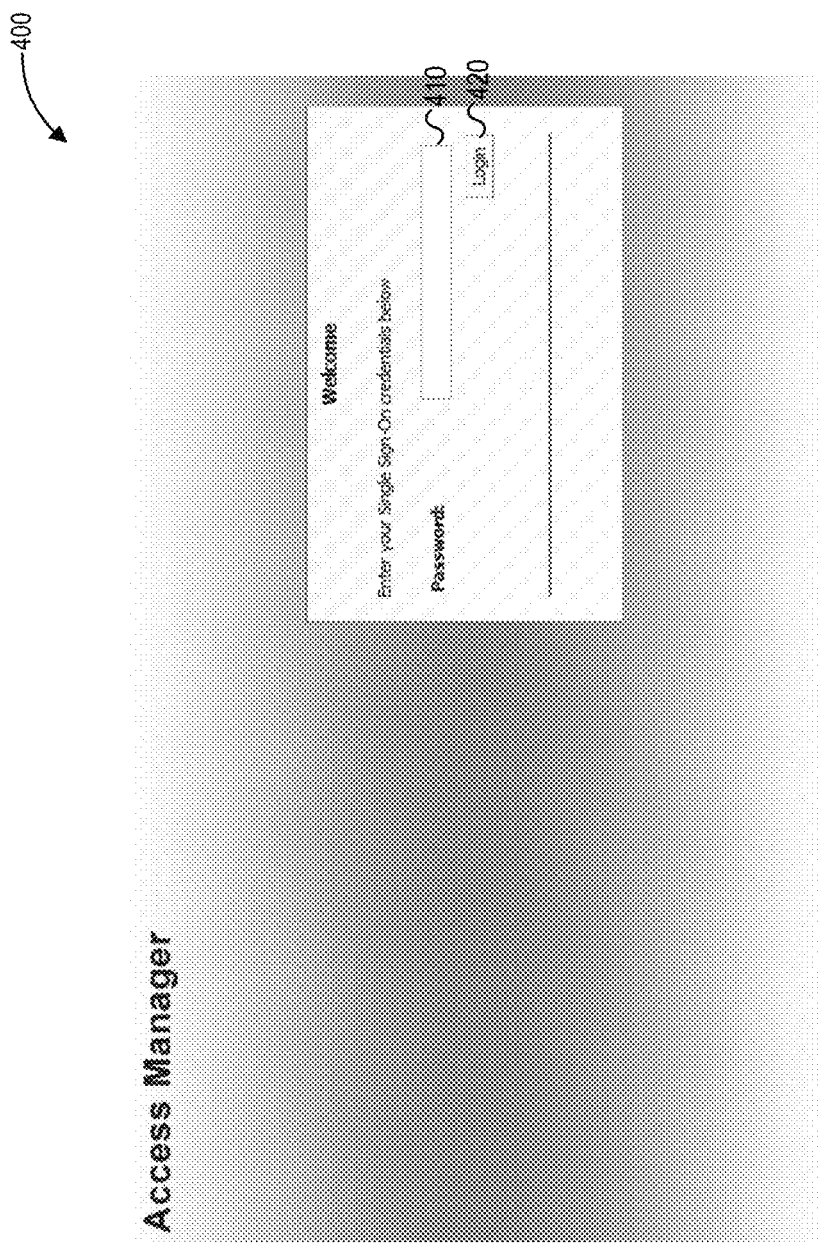
FIGS. 4 and 5 illustrate graphical user interfaces (GUIs) of a process for preventing denial-of-service (DOS) for access by an access management system, in accordance with an embodiment.

FIGS. 4-5 illustrate interfaces (e.g., GUIs) of a process for preventing denial-of-service (DOS) for access by an access management system, in accordance with an embodiment. Each of the GUIs in FIGS. 4-5 may be displayed in an application, e.g., application 106 of FIG. 1. Each of the GUIs in FIG. 4-5 may be displayed by an application. The application may be part of or provided by an access management system (e.g., access management system 140) that manages access to one or more resources.

Now turning to FIG. 4, a GUI 400 is depicted for enabling access to an account of a user. GUI 400 may be rendered at a client upon a user requesting access (e.g., access to an account managed by an access management system) for a user. The GUI may be generated by access management system 140, and either sent to a client or accessed at the client. In some embodiments, GUI 400 may enable a user to provide user identification information. An access management system may identify the client requesting access as being associated with a user. In such instances, GUI 400 may request credential information (e.g., a password), but not user identification information (e.g., a user identifier). Interactive element 410 may receive input such as credential information. Interactive element 420 ("Login") may be interactive to request access based on the credential information. GUI 400 may be displayed for providing SSO access to a user.

In some embodiments, GUI 400 or variations thereof, may be presented at a client after each unsuccessful attempt to obtain access to an account for a user via an access management system 140. GUI 400 may be displayed to prevent an unauthorized user from gaining access without an authorized user's credentials. Access to an account for a user may be configured such that the number of unsuccessful attempts is defined by an access threshold, after which access to the account is locked. In such a scenario, an unauthorized user may initiate unsuccessful access attempts to initiate denial of service to cause access to the account to be restricted, or locked to the user.

The techniques disclosed herein can prevent, if not circumvent a user from being denied access based on the actions of another. In some embodiments, upon satisfying an access threshold, if defined, an access management system can initiate a process by which an authorized user with access can validate himself to unlock access. After unlocking access, the user may still be required to provide credential information.

In at least one embodiment, GUI 500 in FIG. 5 may be presented at a client device to request temporary access information. Upon determining that an access threshold has been satisfied for access (e.g., access to an account), an access management system can send temporary access information to an authorized user associated with the account. Using GUI 500, the user may provide the temporary access information to the access management system. The access management system can verify the temporary access information to determine whether to unlock the access to the user.

In FIG. 5, GUI 500 includes an interactive element 510 ("OTP") that receives as input temporary access information (e.g., a one-time password) sent to a user of a particular account. Interaction element 520 ("Submit") receives input to request the OTP to be submitted from a client (e.g., the client for which access is locked) to an access management system. The client may send the temporary access information to an access management system to determine. The access management system can determine whether the temporary access information matches that which was sent for a user's account to a destination associated with a user.

FIG. 6 illustrates a flowchart 600 of a process for preventing denial-of-service (DOS) for access by an access management system, in accordance with an embodiment. The process of flowchart 600 may be implemented by access management system 140 of FIG. 1.

Flowchart 600 may begin at step 602 by authenticating a user for access from a device (e.g., a first device) to a resource. A user may operate the device to access a resource. Access to one or more resources may be controlled by an access management system.

At step 604, a determination is made that an access threshold for access by the user has been satisfied. The access management system may define access by a user based on one or more criteria, such as an access threshold. The access threshold can be based on a maximum number of unsuccessful attempts to obtain access on behalf of a user from the device via the access management system. The criteria may be defined to control access such that a malicious user unauthorized with access to a resource may not gain access to the resource as the user permitted with access. To prevent brute force and other attempts by an unauthorized user to authenticate as the user to access a resource, one or more criteria may be defined for the access.

In some embodiments, upon determining that the access threshold has been satisfied, an authentication process (e.g., "step-up" authentication) may also be performed. The authentication may be performed in addition to verifying access information. A request may be sent to the first device for credential information to enable the user to request access. Credential information of the user may be received from the first device. The user may be authenticated based on the credential information. The user may be enabled to with access from the device to the resource upon determining that access information matches and further upon determining that the user is authenticated based on the credential information. The user may be prevented with future access from the first device to the resource upon determining that the user cannot be authenticated based on the credential information.

At step 606, access information may be generated. The access information ("first access information") may be associated with one or more criteria, such as a time period. The access information may be temporary (e.g., first temporary access information) by being associated with a time period. At step 608, the access information may be sent to a destination. A destination may be an email address or a telephone number. A destination may be a device (e.g., a second device) that is different from a first device. The first device may provide an interface to receive access information. The first device may receive the access information as input through the interface. At step 610, the first device may be requested to provide the first access information sent to the destination. The first device may present a graphical interface to receive access information. A user of the first device may obtain the access information from the destination, which may be the second device. At step 612, access information (e.g., second access information) may be received from the first device. The second access information may be sent based on the access information received through the interface.

At step 614, a determination is made whether the second access information received from the first device matches the first access information sent to the destination. Upon determining that the the second access information received from the first device matches the first access information, flowchart 600 proceeds to step 616, where a message is sent to the first device. The message may cause the first device to enable the user with access from the first device to a resource. Upon determining that the the second access information received from the first device does not match the first access information, flowchart 600 may proceed to step 618, where a message is sent to the first device. The message causes the first device to prevent the user with future access from the first device to the resource. Flowchart 600 may end at step 620.

Figure 7:
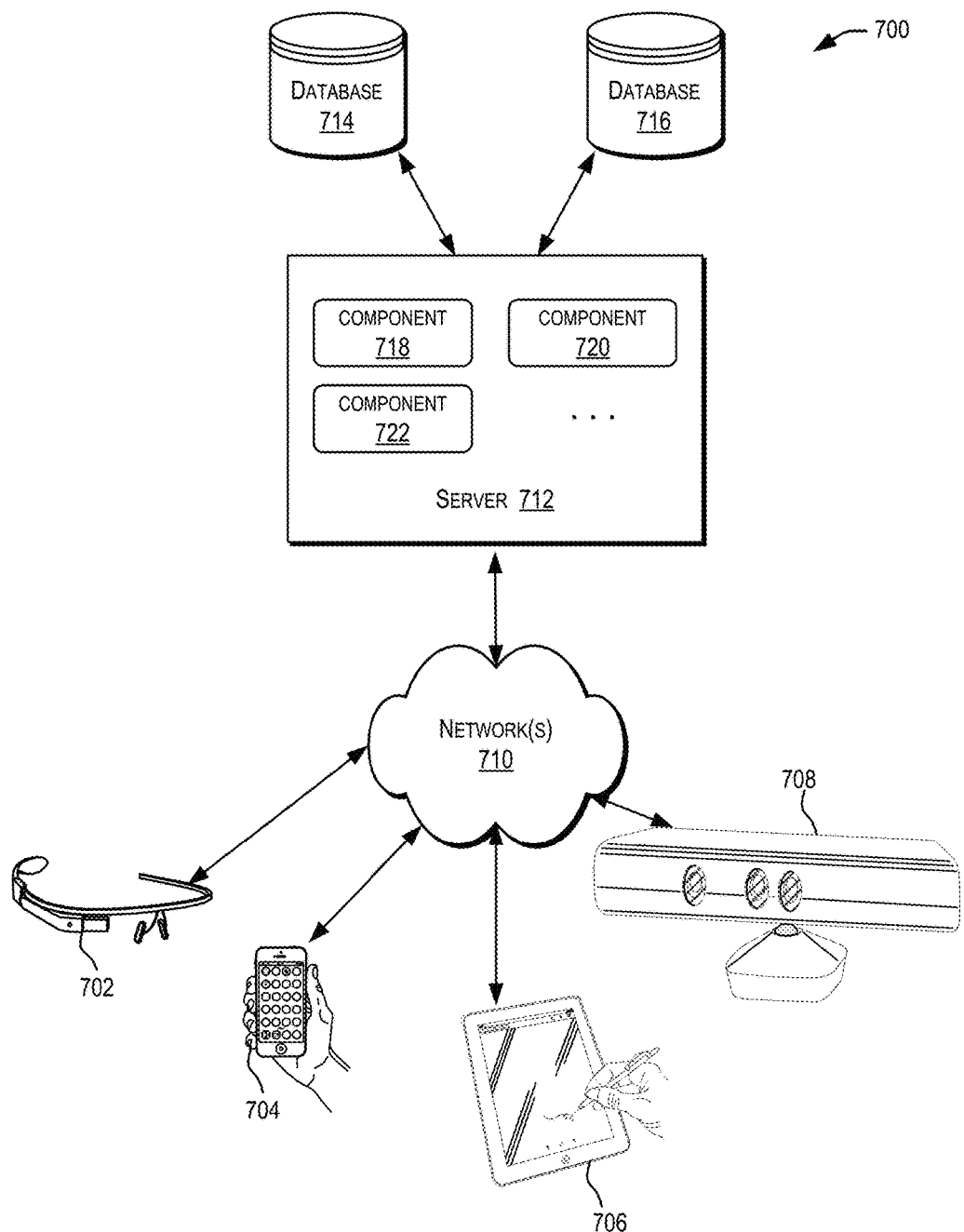
FIG. 7 depicts a simplified diagram of a distributed system for implementing an embodiment.

FIG. 7 depicts a simplified diagram of a distributed system 700 for implementing an embodiment. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications. In certain embodiments, server 712 may also provide other services or software applications can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

Client computing devices 702, 704, 706, and/or 708 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 710.

Although distributed system 700 in FIG. 7 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing as described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. These databases may provide a mechanism for storing information such as user interactions information, usage patterns information, adaptation rules information, and other information used by embodiments of the present disclosure. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle that are adapted to store, update, and retrieve data in response to SQL-formatted commands.

Figure 8:
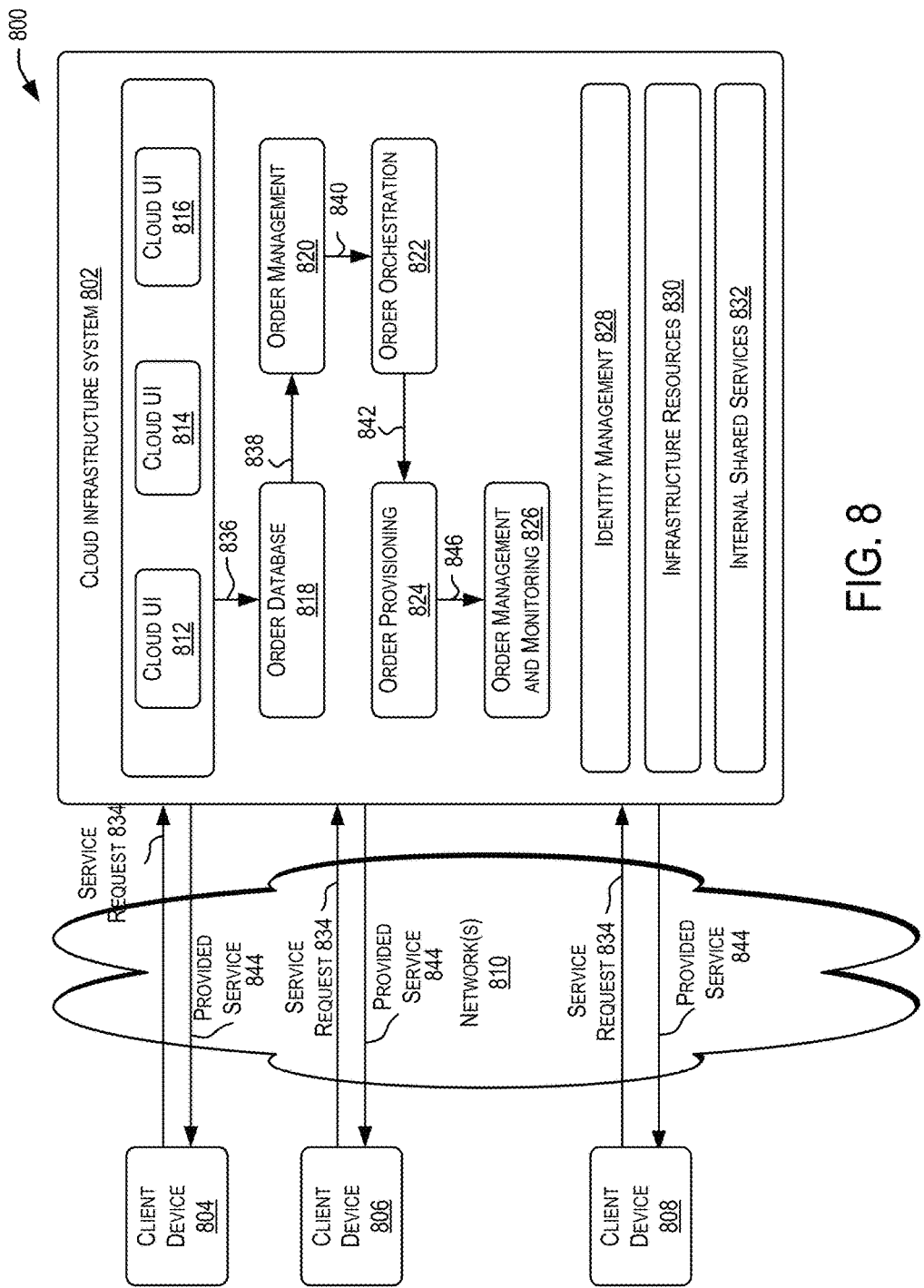
FIG. 8 illustrates a simplified block diagram of one or more components of a system environment in which services may be offered as cloud services, in accordance with an embodiment of the present disclosure.

In some embodiments, a cloud environment may provide one or more services. FIG. 8 is a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the present disclosure. In some other embodiments, cloud infrastructure system 802 may have more or fewer components than shown in the figure, may combine two or more components, or may have a different configuration or arrangement of components.

Client computing devices 804, 806, and 808 may be devices similar to those described above for client computing devices 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at step 834, a customer using a client device, such as client computing devices 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At step 836, the order information received from the customer may be stored in an order database 818. If this is a new order, a new record may be created for the order. In one embodiment, order database 818 can be one of several databases operated by cloud infrastructure system 818 and operated in conjunction with other system elements.

At step 838, the order information may be forwarded to an order management module 820 that may be configured to perform billing and accounting functions related to the order, such as verifying the order, and upon verification, booking the order.

At step 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at step 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 822 to be isolated from implementation details, such as whether or not services and resources are actually provisioned on the fly or pre-provisioned and only allocated/assigned upon request.

At step 844, once the services and resources are provisioned, a notification may be sent to the subscribing customers indicating that the requested service is now ready for use. In some instance, information (e.g. a link) may be sent to the customer that enables the customer to start using the requested services.

At step 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
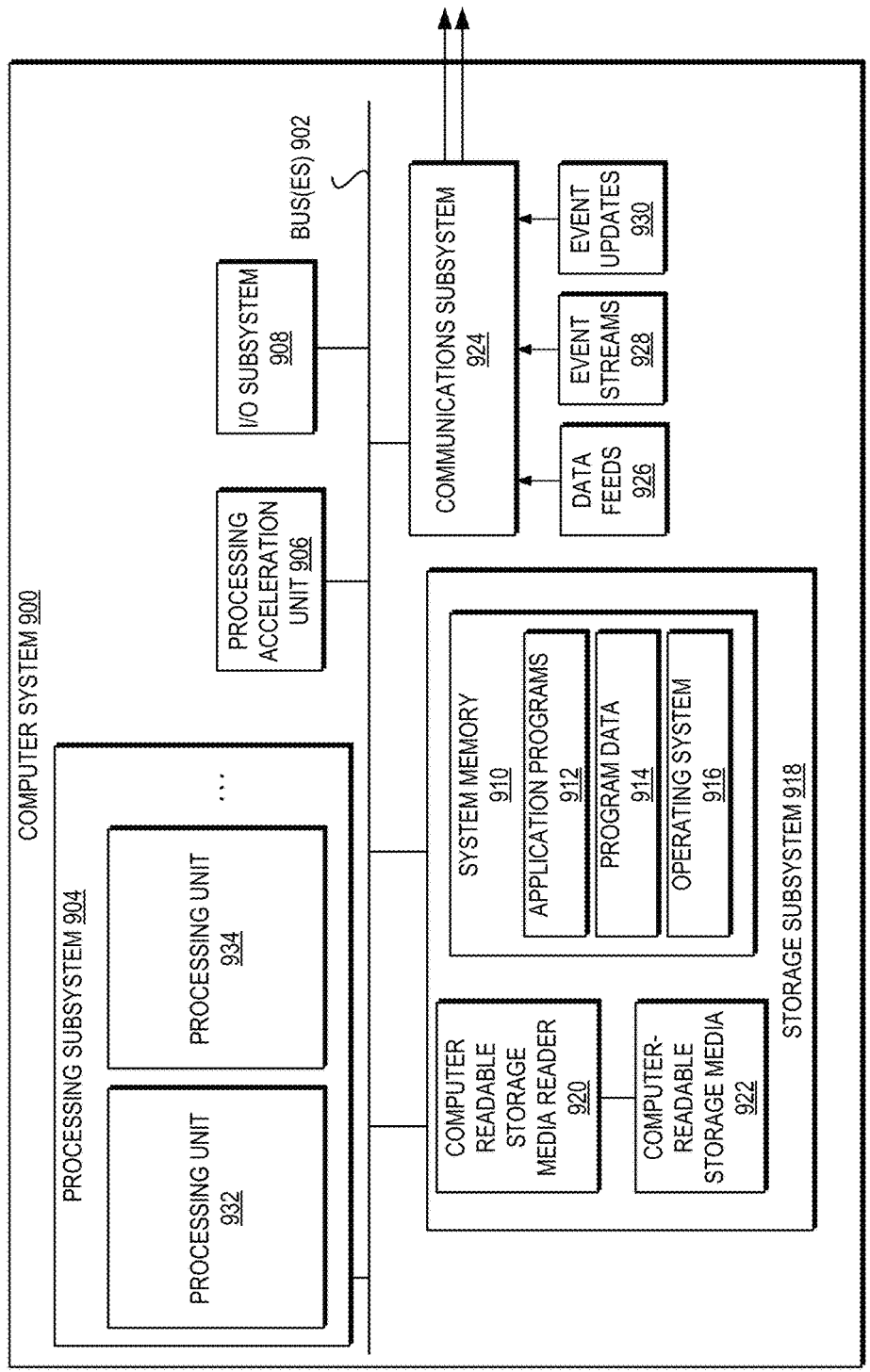
FIG. 9 illustrates an exemplary computer system that may be used to implement an embodiment of the present disclosure.

FIG. 9 illustrates an exemplary computer system 900 that may be used to implement an embodiment of the present disclosure. In some embodiments, computer system 900 may be used to implement any of the various servers and computer systems described above. As shown in FIG. 9, computer system 900 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client computing devices via the Internet for receiving and sending information from and to the client computing devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   determining, at a computing system of an access management system, that an access threshold has been satisfied, the access threshold being based on a maximum number of unsuccessful attempts to obtain access to a resource on behalf of a user from a device via the access management system, wherein the access attempts are received by the access management system on a first channel of communication;
   upon determining that the access threshold has been satisfied, sending, to a destination associated with the user, first temporary access information for the user to authenticate the access management system, wherein the destination is different from the device and the first temporary access information is communicated to the destination using a second channel of communication that is different from the first channel of communication;
   receiving, from the device, second temporary access information;
   determining whether the second temporary access information matches the first temporary access information sent to the destination;
   upon determining that the second temporary access information matches the first temporary access information sent to the destination, sending a message to the device, the message causing the device to enable the user with access from the device to the resource; and
   upon determining that the second temporary access information does not match the first temporary access information sent to the destination, sending a message to the device, the message causing the device to prevent the user with future access from the device to the resource.

2. The method of claim 1, further comprising:
   generating the first temporary access information; and
   after sending the first temporary access information to the destination, sending to the device a request for the first temporary access information.

3. The method of claim 1, wherein the device is a first computing device and wherein the destination is a second computing device that is different from the first computing device.

4. The method of claim 1, wherein the destination is an email address or a telephone number accessible using a mobile device.

5. The method of claim 1, wherein resource is accessed based on an account managed by the access management system, and wherein the account provides access to the resource that is enabled by the access management system.

6. The method of claim 1, wherein the first temporary access information is a password that is associated with a time period.

7. The method of claim 1, further comprising:
   generating a graphical interface to receive access information to determine access from the device to the resource; and
   sending the graphical interface to the device, wherein the device displays the graphical interface, wherein the device receives the first temporary access information as input by the user through the graphical interface, and wherein the first temporary access information that is received by the device is sent by the device as the second temporary access information that is received from the device.

8. The method of claim 1, further comprising:
   storing data in association with information about the user upon sending the first temporary access information to the destination.

9. The method of claim 8, further comprising:
   updating the data to indicate that the second temporary access information was received.

10. The method of claim 8, further comprising:
    upon determining that the second temporary access information matches the first temporary access information sent to the destination, updating the data to indicate that the user is enabled to request access on behalf of the user from the device via the access management system.

11. The method of claim 8, further comprising:
    upon determining that the second temporary access information does not match the first temporary access information sent to the destination, updating the data to indicate that the user is prevented from future attempts to obtain access on behalf of the user from the device via the access management system.

12. A method comprising:
    determining, at a computing system of an access management system, that an access threshold has been satisfied, the access threshold being based on a maximum number of unsuccessful attempts to obtain access on behalf of a user from a device via the access management system;
    upon determining that the access threshold has been satisfied, sending, to a destination associated with the user, first temporary access information for the user to authenticate the access management system;
    receiving, from the device, second temporary access information;
    determining whether the second temporary access information matches the first temporary access information sent to the destination;

upon determining that the second temporary access information matches the first temporary access information sent to the destination, sending to the device a request for credential information to enable the user to request access to a resource;
receiving the credential information from the device;
determining, at the computer system, whether the received credential information is valid for the user;
upon determining that the received credential information is valid, authenticating the user based on the credential information and sending a message to the device, wherein the message causes the device to enable the user with access from the device to the resource; and
upon determining that the second temporary access information does not match the first temporary access information sent to the destination or upon determining that the received credential information is invalid, sending a message to the device, the message causing the device to prevent the user with future access from the device to the resource.

13. A method comprising:
determining, at a computing system of an access management system, that an access threshold has been satisfied, the access threshold being based on a maximum number of unsuccessful attempts to obtain access on behalf of a user from a device via the access management system;
sending, to a destination associated with the user, first temporary access information for the user to authenticate the access management system;
upon sending the first temporary access information to the destination, storing data in association with information about the user;
receiving, from the device, second temporary access information;
determining whether the second temporary access information matches the first temporary access information sent to the destination;
upon determining that the second temporary access information matches the first temporary access information sent to the destination, updating the data to indicate that the user is enabled to request access on behalf of the user from the device via the access management system and sending a message to the device, the message causing the device to enable the user with access from the device to a resource;
upon determining that the second temporary access information does not match the first temporary access information sent to the destination, sending a message to the device, the message causing the device to prevent the user with future access from the device to the resource
receiving, from the device, a new request for access on behalf of the user; and
enabling the new request for access based on the data indicating that the user is enabled to request access on behalf of the user from the device via the access management system.

14. A method comprising:
determining, at a computing system of an access management system, that an access threshold has been satisfied, the access threshold being based on a maximum number of unsuccessful attempts to obtain access on behalf of a user from a device via the access management system;
sending, to a destination associated with the user, first temporary access information for the user to authenticate the access management system;
upon sending the first temporary access information to the destination, storing data in association with information about the user;
receiving, from the device, second temporary access information;
determining whether the second temporary access information matches the first temporary access information sent to the destination;
upon determining that the second temporary access information matches the first temporary access information sent to the destination, sending a message to the device, the message causing the device to enable the user with access from the device to a resource;
upon determining that the second temporary access information does not match the first temporary access information sent to the destination, updating the data to indicate that the user is prevented from future attempts to obtain access on behalf of the user from the device via the access management system and sending a message to the device, the message causing the device to prevent the user with future access from the device to the resource;
receiving, from the device, a new request for access on behalf of the user; and
preventing the new request for access based on the data indicating that the user is prevented from future attempts to obtain access on behalf of the user from the device via the access management system.

15. A system comprising:
one or more processors; and
a memory coupled accessible to the one or more processors, the memory storing one or more instructions that, upon execution by the one or more processors, causes the one or more processors to:
determine, at an access management system, that an access threshold has been satisfied, the access threshold being based on a maximum number of unsuccessful attempts to obtain access on behalf of a user from a device via the access management system;
upon determining that the access threshold has been satisfied, send, to a destination associated with the user, first temporary access information for the user to authenticate the access management system;
receive, from the device, second temporary access information;
determine whether the second temporary access information matches the first temporary access information sent to the destination;
upon determining that the second temporary access information matches the first temporary access information sent to the destination, sending to the device a request for credential information to enable the user to request access to a resource
receive the credential information from the device;
determine, at the access management system, whether the received credential information is valid for the user;
upon determining that the received credential information is valid, authenticate the user based on the credential information and send a message to the device, the message causing the device to enable the user with access from the device to the resource; and
upon determining that the second temporary access information does not match the first temporary access information sent to the destination or upon determining that the received credential information is invalid, send a message to the device, the message causing the device to prevent the user with future access from the device to the resource.

16. The system of claim 15, wherein the one or more instructions, upon execution by the one or more processors, further causes the one or more processors to:
after sending the first temporary access information to the destination, send to the device a request for the first temporary access information.

17. A non-transitory computer-readable medium storing one or more instructions that, upon execution by one or more processors, causes the one or more processors to:
determine, at a computing system of an access management system, that an access threshold has been satisfied, the access threshold being based on a maximum number of unsuccessful attempts to obtain access on behalf of a user from a device via the access management system;
upon determining that the access threshold has been satisfied, send, to a destination associated with the user, first temporary access information for the user to authenticate the access management system;
receive, from the device, second temporary access information;
determine whether the second temporary access information matches the first temporary access information sent to the destination;
upon determining that the second temporary access information matches the first temporary access information sent to the destination, sending to the device a request for credential information to enable the user to request access to a resource
receive the credential information from the device;
determine, at the access management system, whether the received credential information is valid for the user;
upon determining that the received credential information is valid, authenticate the user based on the credential information and send a message to the device, the message causing the device to enable the user with access from the device to the resource; and
upon determining that the second temporary access information does not match the first temporary access information sent to the destination or upon determining that the received credential information is invalid, send a message to the device, the message causing the device to prevent the user with future access from the device to the resource.

18. The non-transitory computer-readable medium of claim 17, wherein the device is a first computing device and wherein the destination is a second computing device that is different from the first computing device.

* * * * *

UNITED STATES PATENT AND TRADEMARK OFFICE
CERTIFICATE OF CORRECTION

PATENT NO. : 10,225,283 B2
APPLICATION NO. : 15/298624
DATED : March 5, 2019
INVENTOR(S) : Stephen Mathew et al.

Page 1 of 1

It is certified that error appears in the above-identified patent and that said Letters Patent is hereby corrected as shown below:

In the Specification

Column 1, Line 10: "Oct 23, 2015" should read "Oct 22, 2015"

Signed and Sealed this
Thirtieth Day of July, 2019

Andrei Iancu
*Director of the United States Patent and Trademark Office*